(12) United States Patent
Kobayashi et al.

(10) Patent No.: US 7,155,342 B2
(45) Date of Patent: Dec. 26, 2006

(54) DRIVING ASSIST SYSTEM FOR VEHICLE

(75) Inventors: Yosuke Kobayashi, Yokohama (JP); Genpei Naito, Yokohama (JP); Takeshi Kimura, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 261 days.

(21) Appl. No.: 10/967,229

(22) Filed: Oct. 19, 2004

(65) Prior Publication Data

US 2005/0090984 A1 Apr. 28, 2005

(30) Foreign Application Priority Data

Oct. 23, 2003 (JP) ............... 2003-363673

(51) Int. Cl.
*B60K 28/00* (2006.01)
(52) U.S. Cl. ................ 701/301; 701/36; 340/436; 340/903
(58) Field of Classification Search ............. 701/36, 701/70, 93, 96, 300, 301; 342/455; 340/435, 340/436, 903; 180/167, 169, 170
See application file for complete search history.

(56) References Cited

U.S. PATENT DOCUMENTS

| 4,628,317 | A | 12/1986 | Nishikawa et al. | |
|---|---|---|---|---|
| 6,832,157 | B1 | 12/2004 | Egami | |
| 6,873,911 | B1 | 3/2005 | Nishira et al. | |
| 6,917,872 | B1* | 7/2005 | Egami ..................... | 701/96 |
| 6,982,647 | B1* | 1/2006 | Kuge et al. ............... | 340/576 |
| 7,006,917 | B1* | 2/2006 | Hijikata .................... | 701/301 |
| 2003/0122420 | A1 | 7/2003 | Tarabishy et al. | |
| 2003/0163240 | A1 | 8/2003 | Egami | |
| 2004/0059482 | A1 | 3/2004 | Hijikata | |
| 2004/0172185 | A1 | 9/2004 | Yamamura et al. | |
| 2004/0249549 | A1 | 12/2004 | Kondoh et al. | |
| 2005/0033517 | A1 | 2/2005 | Kondoh et al. | |
| 2005/0065687 | A1 | 3/2005 | Hijikata et al. | |
| 2005/0090984 | A1 | 4/2005 | Kobayashi et al. | |
| 2005/0288844 | A1* | 12/2005 | Kimura et al. ........... | 701/100 |

FOREIGN PATENT DOCUMENTS

| DE | 196 20 929 A1 | 11/1997 |
|---|---|---|
| DE | 198 21 163 A1 | 11/1999 |
| EP | 1 300 275 A1 | 4/2003 |
| EP | 1 346 892 A2 | 9/2003 |
| EP | 1 375 234 A2 | 1/2004 |
| GB | 1 330 879 | 9/1973 |
| JP | 09-277850 A | 10/1997 |
| JP | 9-286313 | 11/1997 |

(Continued)

OTHER PUBLICATIONS

U.S. Appl. No. 10/682,959, filed Oct. 14, 2003, Hijikata.

(Continued)

*Primary Examiner*—Gary Chin
(74) *Attorney, Agent, or Firm*—McDermott Will & Emery LLP

(57) ABSTRACT

A vehicle driving assist system calculates a risk potential of the subject vehicle with respect to a front obstacle by estimating a compression amount of a vertical resilient member which is imaginary provided at the front of the subject vehicle when the subject vehicle approaches the front obstacle. The correction amounts of drive force and braking force and the correction amount of reaction force are calculated based upon the calculated risk potential so as to perform drive force/braking force correction control and reaction force control simultaneously.

20 Claims, 15 Drawing Sheets

FOREIGN PATENT DOCUMENTS

| | | |
|---|---|---|
| JP | 10-166889 | 6/1998 |
| JP | 10-166890 | 6/1998 |
| JP | 2000-054860 | 2/2000 |

OTHER PUBLICATIONS

U.S. Appl. No. 10/226,232, filed Aug. 23, 2002, Yamamura et al.

* cited by examiner

WHEN THE DISTANCE TO THE PRECEDING VEHICLE IS LONG

WHEN THE DISTANCE TO THE PRECEDING VEHICLE IS SHORT

DRIVING ASSIST SYSTEM FOR VEHICLE

BACKGROUND OF THE INVENTION

1. Field of the Invention

The present invention relates to a driving assist system for a subject vehicle, for assisting operations carried out by a driver.

2. Description of Related Art

System for assisting driver's operation include a system disclosed in Japanese Laid-open Patent Publication No. H10-166889. This system changes operation reaction force of an accelerator pedal based on an inter-vehicle distance between a preceding vehicle and a subject vehicle. Warning is given to a driver by increasing reaction force of the acceleration pedal as the distance between vehicles decreases. Further, the system disclosed in Japanese Laid-Open Patent Publication No. H9-286313 sends warnings to a driver by lowering speed in conformance with obstacle information.

SUMMARY OF THE INVENTION

It is therefore desirable for the vehicle driving assist system described above to make a driver aware of risk surrounding a subject vehicle, and also make it possible to control behavior of the subject vehicle taking into consideration the possibility of contact between the subject vehicle and an obstacle.

A vehicle driving assist system according to the present invention comprises an obstacle detection device that detects an obstacle in vehicle surroundings; a risk potential calculation device that calculates a risk potential of a subject vehicle with respect to the obstacle based on detection results of the obstacle detection device; a drive torque correction device that reduces drive torque generated at the subject vehicle, based on the risk potential calculated by the risk potential calculation device; and a reaction force control device that controls reaction force generated at an operation device through which a travel command for the subject vehicle is issued according to a correction amount for the drive torque to be reduced by the drive torque correction device.

A vehicle driving assist system according to the present invention comprises an obstacle detection device that detects an obstacle in vehicle surroundings; a risk potential calculation device that calculates a current risk potential of a subject vehicle with respect to the obstacle based on detection results of the obstacle detection device; an accelerator pedal operation amount detection device that detects an operation amount of an accelerator pedal; a drive torque correction device that corrects a relationship of drive torque with respect to the accelerator pedal operation amount in a reduction direction based on the current risk potential calculated by the risk potential calculation device; an engine control device that controls an engine to generate the drive torque calculated by the drive torque correction device; a reaction force calculation device that calculates a reaction force to be generated at an operation device through which a travel command for the subject vehicle is issued based upon the current risk potential calculated by the risk potential calculation device; and a reaction force generation device that generates the reaction force calculated by the reaction force calculation device.

A vehicle driving assist system according to the present invention comprises an obstacle detection means for detecting an obstacle in vehicle surroundings; a risk potential calculation means for calculating a risk potential of a subject vehicle with respect to the obstacle based on detection results of the obstacle detection means; a drive torque correction means for reducing drive torque generated at the subject vehicle, based on the risk potential calculated by the risk potential calculation means; and a reaction force control means for controlling reaction force generated at an operation device through which a travel command for the subject vehicle is issued according to a correction amount for the drive torque to be reduced by the drive torque correction means.

A vehicle driving assist system according to the present invention comprises an obstacle detection means for detecting an obstacle in vehicle surroundings; a risk potential calculation means for calculating a current risk potential of a subject vehicle with respect to the obstacle based on detection results of the obstacle detection means; an accelerator pedal operation amount detection means for detecting an operation amount of an accelerator pedal; a drive torque correction means for correcting a relationship of drive torque with respect to the accelerator pedal operation amount in a reduction direction based on the current risk potential calculated by the risk potential calculation means; an engine control means for controlling an engine to generate the drive torque calculated by the drive torque correction means; a reaction force calculation means for calculating a reaction force to be generated at an operation device through which a travel command for the subject vehicle is issued based upon the current risk potential calculated by the risk potential calculation means; and a reaction force generation means for generating the reaction force calculated by the reaction force calculation means.

In a vehicle driving assist method according to the present invention, an obstacle in vehicle surroundings is detected; a risk potential of a subject vehicle with respect to the obstacle is calculated based on obstacle conditions thus detected; drive torque generated at the subject vehicle is reduced based on the risk potential thus calculated; and reaction force generated at an operation device through which a travel command for the subject vehicle is issued is controlled according to a correction amount for the drive torque to be reduced.

In a vehicle driving assist method according to the present invention, an obstacle in vehicle surroundings is detected; a current risk potential of a subject vehicle with respect to the obstacle is calculated based on obstacle conditions thus detected; an operation amount of an accelerator pedal is detected; a relationship of drive torque with respect to the accelerator pedal operation amount is corrected in a reduction direction based on the calculated current risk potential; an engine is controlled to generate the drive torque thus calculated; a reaction force to be generated at an operation device through which a travel command for the subject vehicle is issued is calculated based upon the calculated current risk potential; and the reaction force thus calculated is applied to the operation device.

A vehicle according to the present invention comprises a vehicle driving assist system that comprises (a) an obstacle detection device that detects an obstacle in vehicle surroundings; (b) a risk potential calculation device that calculates a risk potential of a subject vehicle with respect to the obstacle based on detection results of the obstacle detection device; (c) a drive torque correction device that reduces drive torque generated at the subject vehicle based on the risk potential calculated by the risk potential calculation device; and (d) a reaction force control device that controls reaction force generated at an operation device through which a travel command for the subject vehicle is issued according to a correction amount for the drive torque to be reduced by the drive torque correction device.

A vehicle according to the present invention comprises a vehicle driving assist system that comprises (a) an obstacle detection device that detects an obstacle in vehicle surroundings; (b) a risk potential calculation device that calculates a current risk potential of a subject vehicle with respect to the obstacle based on detection results of the obstacle detection device; (c) an accelerator pedal operation amount detection device that detects an operation amount of an accelerator pedal; (d) a drive torque correction device that corrects a relationship of drive torque with respect to the accelerator pedal operation amount in a reduction direction based on the current risk potential calculated by the risk potential calculation device; (e) an engine control device that controls an engine to generate the drive torque calculated by the drive torque correction device; (f) a reaction force calculation device that calculates a reaction force to be generated at an operation device through which a travel command for the subject vehicle is issued based upon the current risk potential calculated by the risk potential calculation device; and (g) a reaction force generation device that generates the reaction force calculated by the reaction force calculation device.

DESCRIPTION OF THE PREFERRED EMBODIMENTS

First Embodiment

Figure 1:
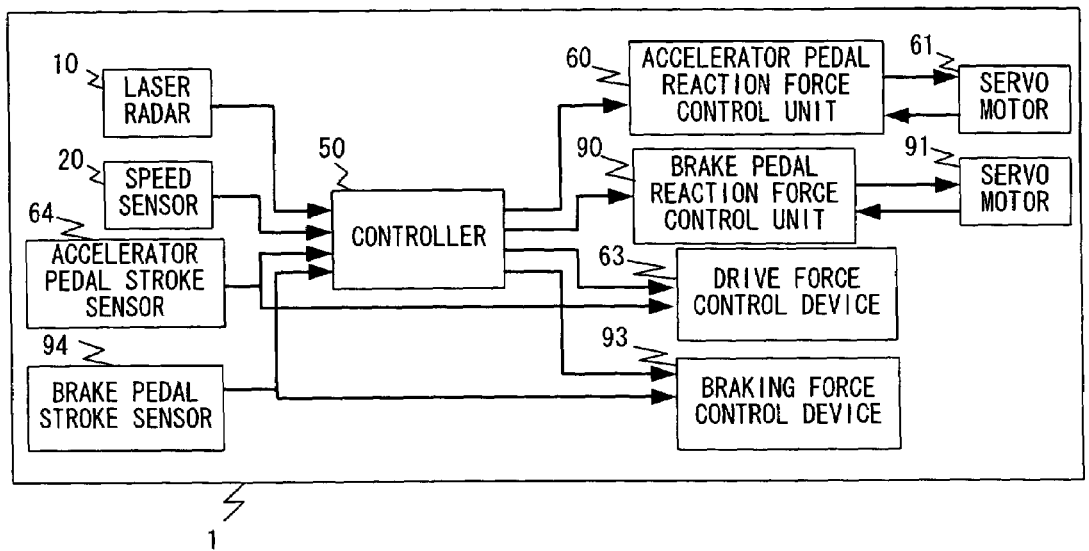
FIG. 1 is a system view of a vehicle driving assist system of a first embodiment of the present invention.
Figure 2:
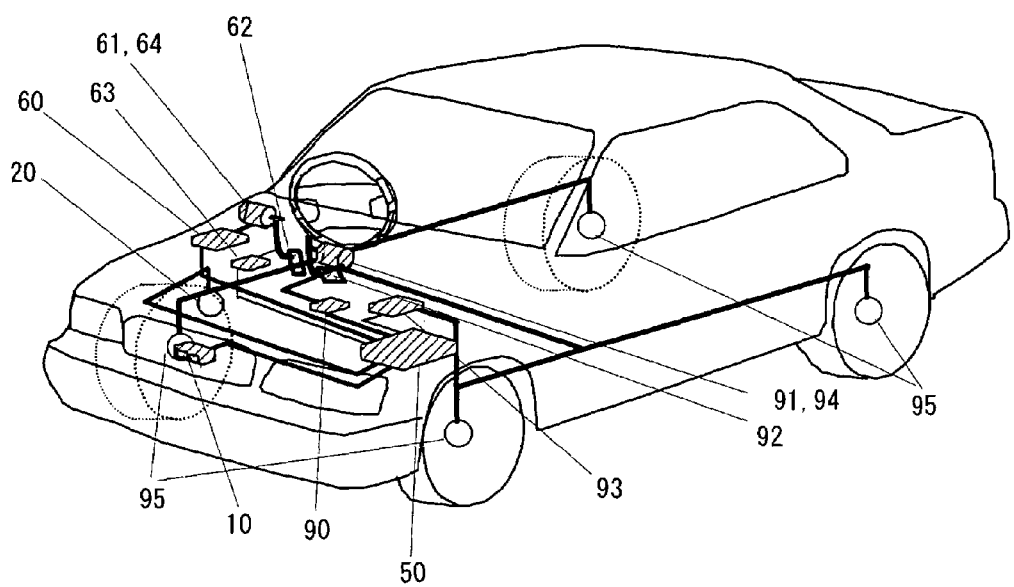
FIG. 2 is a structural drawing of a subject vehicle fitted with the vehicle driving assist system shown in FIG. 1.

The following is a description using the drawings of a vehicle driving assist system of a first embodiment of the present invention. FIG. 1 is a system drawing showing the structure of a vehicle driving assist system 1 of the first embodiment of the present invention, and FIG. 2 is a structural drawing of a subject vehicle fitted with the vehicle driving assist system 1.

First of all the structure of the vehicle driving assist system 1 will be described. A laser radar 10 is attached to a front grill section of a subject vehicle or to a bumper etc., and irradiates infrared light pulses in a horizontal direction so as to scan the region ahead of the subject vehicle. The laser radar 10 measures reflected waves of infrared light pulses reflected by a plurality of reflecting objects ahead (normally the rear of a preceding vehicle), and detects a distance from the subject vehicle to each of vehicles to the front and directions of these vehicles relative to the subject vehicle based on the time it takes reflected waves to come back. The detected distance between vehicles and directions of the vehicles to the front are output to a controller 50. In this embodiment, the direction in which a vehicle in front of the subject vehicle exists can be expressed as a relative angle with respect to the subject vehicle. Forward regions scanned by the laser radar 10 are about ±6° each side of a longitudinal centerline of the subject vehicle and forward objects existing within this range are detected.

A vehicle speed sensor 20 detects a traveling speed of the subject vehicle by measuring rotational speed of wheels or rotational speed of an output shaft of a transmission and outputs the detected vehicle speed to the controller 50.

The controller 50 includes a CPU and CPU peripheral devices, such as ROM, RAM etc., and performs overall control of the vehicle driving assist system 1. The controller 50 determines obstacle conditions or hazardous conditions of the vehicle surroundings, for example, traveling conditions with respect to obstacles such as, for example, a relative distance and relative speed between the subject vehicle and each obstacle based on the subject vehicle speed inputted from the vehicle speed sensor 20 and distance information inputted from the laser radar 10. The controller 50 calculates a risk potential of the subject vehicle with respect to each obstacle based on the obstacle conditions. Further, the controller 50 carries out the following control based on the risk potential with respect to obstacles.

In this way, by controlling reaction force generated when depressing an accelerator pedal 62 or a brake pedal 92, the vehicle driving assist system 1 of the first embodiment of the present invention assists the driver's operation for accelerating or decelerating the subject vehicle, and appropriate assistance is provided for driving operations performed by the driver. The controller 50 calculates a degree of reaction force control in a front-to-back direction of the subject vehicle based on the risk potential with respect to the obstacle to the front of the subject vehicle in accordance with the obstacle conditions. The controller 50 then outputs the calculated degree of reaction force control in the front-to-back direction to an accelerator pedal reaction force control device 60 and a brake pedal reaction force control device 90.

Further, the vehicle driving assist system 1 controls drive force and braking force generated at the subject vehicle based on the obstacle conditions for the vehicle surroundings. Specifically, correction amounts for drive force and braking force are calculated according to the risk potential, and are outputted to a drive force control device 63 and a braking force control device 93, respectively.

The accelerator pedal reaction force control device 60 controls a torque generated by a servo motor 61 incorporated into a link mechanism of the accelerator pedal 62 according to the degree of reaction force control outputted from the controller 50. At the servo motor 61, the reaction force to be generated is controlled according to an instruction value from the accelerator pedal reaction force control device 60 and thus, the level of reaction force generated when the driver operates the accelerator pedal 62 can be controlled as desired.

An accelerator pedal stroke sensor 64 detects operation amount or depression amount of the accelerator pedal 62 converted to a rotation angle of the servo motor 61 via the link mechanism. The accelerator pedal stroke sensor 64 outputs the detected operation amount of the acceleration pedal to the controller 50 and the drive force control device 63.

The brake pedal reaction force control device 90 controls a torque generated by a servo motor 91 incorporated into a link mechanism of the brake pedal 92 according to the degree of reaction force control outputted from the controller 50. At the servo motor 91, a reaction force to be generated is controlled according to an instruction value from the brake pedal reaction force control device 90 and thus, the level of the reaction force generated when the driver operates the brake pedal 92 can be controlled as desired. It is to be noted while the reaction force of the brake pedal is controlled by the servomotor 91, the present invention is by no means limited in this respect, and, for example, hydraulic force brought about by computer control may also be used to generate brake assist force.

A brake pedal stroke sensor 94 detects an operation amount or depression amount of the brake pedal 92 converted to a rotation angle of the servo motor 91 via the link mechanism. The brake pedal stroke sensor 94 outputs the detected operation amount of the brake pedal to the controller 50 and the braking force control device 93.

Figure 3:
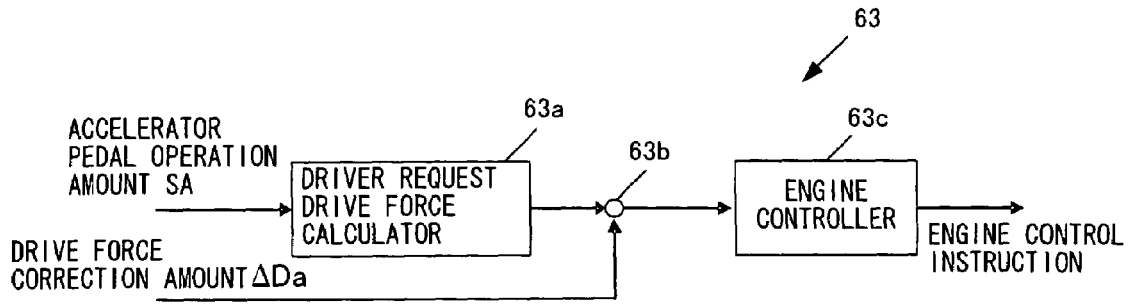
FIG. 3 illustrates an outline of drive force control.
Figure 4:
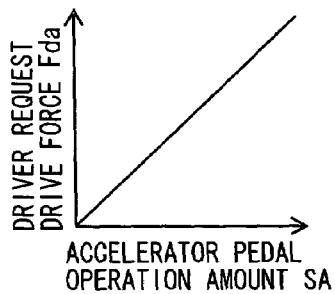
FIG. 4 shows a relationship between extent of operation of an accelerator pedal and required drive force.

The drive force control device 63 controls an engine (not shown) in such a manner that drive force is generated according to the operating conditions of the accelerator pedal 62, and changes drive force to be generated according to instructions from outside, i.e. instructions from the controller 50. A block view showing the configuration of the drive force control device 63 is shown in FIG. 3. A characteristic map defining a relationship between an accelerator pedal operation amount SA and a driver request drive force Fda is shown in FIG. 4. The drive force control device 63 includes a driver request drive force calculator 63a, an adder 63b, and an engine controller 63c as shown in FIG. 3.

The driver request drive force calculator 63a calculates a drive force (driver request drive force) Fda required by the driver according to the operation amount SA (accelerator pedal operation amount) when the accelerator pedal 62 is depressed using the map shown in FIG. 4. The adder 63b calculates a target drive force by adding a drive force correction amount ΔDa described later to the calculated driver request drive force Fda, and outputs the target drive force to the engine controller 63c. The engine controller 63c calculates an engine control instruction value according to the target drive force. The engine control instruction value is, for example, an instruction value for controlling a throttle valve position, and the engine controller 63c adjusts a position of a throttle valve in such a manner that the target drive force is implemented.

Figure 5:
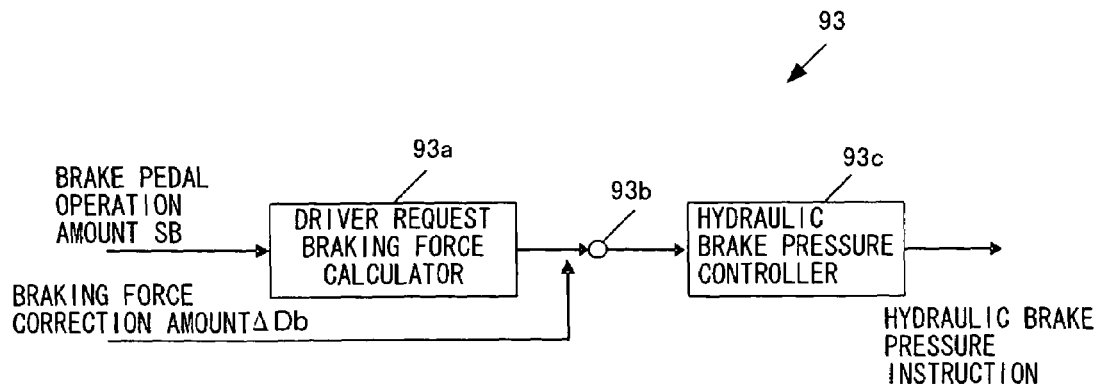
FIG. 5 illustrates an outline of braking force control.
Figure 6:
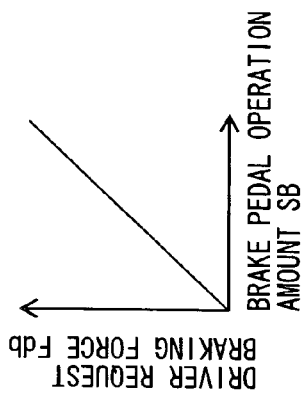
FIG. 6 shows a relationship between extent of operation of a brake pedal and required braking force.

The braking force control device 93 controls hydraulic brake pressure in such a manner that braking force is generated according to the operating conditions of the brake pedal 92, and changes hydraulic brake pressure to be generated according to instructions from outside, i.e. instructions from the controller 50. A block view showing the configuration of the braking force control device 93 is shown in FIG. 5. A characteristic map defining the relationship between a brake pedal operation amount SB and a driver request braking force Fdb is shown in FIG. 6. As shown in FIG. 5, the braking force control device 93 includes a driver request braking force calculator 93a, an adder 93b, and a hydraulic brake pressure controller 93c.

The driver request braking force calculator 93a calculates a braking force (driver request braking force) Fdb required by the driver according to the depression amount (brake pedal operation amount) SB of the brake pedal 92 using the map shown in FIG. 6. The adder 93b calculates a target braking force by adding a brake force correction value ΔDb described later to the calculated driver request braking force Fdb, and outputs the target braking force to the hydraulic brake pressure controller 93c. The hydraulic brake pressure controller 93c calculates a hydraulic brake pressure instruction value according to the target brake force. Brake devices 95 provided at each wheel then operate according to instructions from the hydraulic brake pressure controller 93c.

Figure 7:
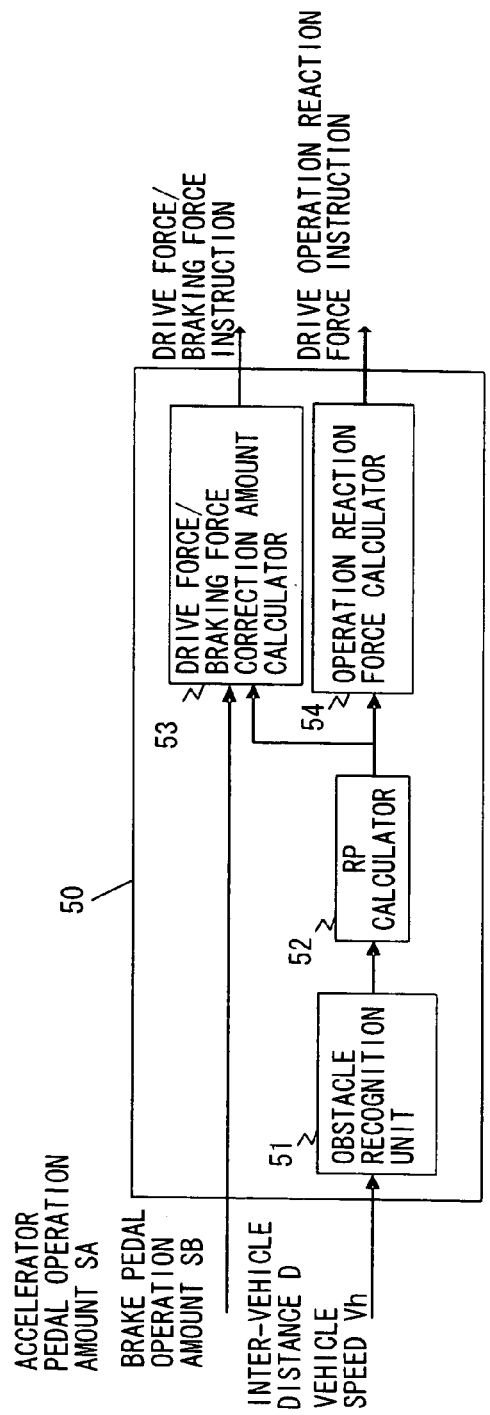
FIG. 7 is a block view showing the configuration of the inside of a controller.

A block view showing the configuration of the inside and periphery of the controller 50 is shown in FIG. 7. The controller 50 is constituted of an obstacle recognition unit 51, a risk potential (RP) calculation unit 52, a drive force/braking force correction amount calculation unit 53, and an operation reaction force calculation unit 54 in the form of software in CPU.

The obstacle recognition unit 51 receives signals from the laser radar 10 and the subject vehicle speed sensor 20 and recognizes obstacle conditions in the front region of the subject vehicle. Specifically, the inter-vehicle distance to a preceding vehicle and the relative speed is calculated, and a vehicle speed is detected. The risk potential calculation unit 52 calculates a risk potential RP of the subject vehicle with respect to a front obstacle based on recognition results of the obstacle recognition unit 51. The drive force/braking force correction amount calculation unit 53 calculates correction amounts of drive force and braking force based on the risk potential RP calculated by the risk potential calculation unit 52. The operation reaction force calculation unit 54 calculates a reaction force control instruction value for the accelerator pedal 62 and a reaction force control instruction value for the brake pedal 92 based on the risk potential RP calculated by the risk potential calculation unit 52.

The controller 50 carries out the reaction force control of the accelerator pedal 62 and brake pedal 92 and drive force/braking force control based on the same risk potential RP calculated at the risk potential calculator 52. Namely, the operation reaction force control and the drive force/braking force control are carried out simultaneously based on the same risk potential.

Figure 8:
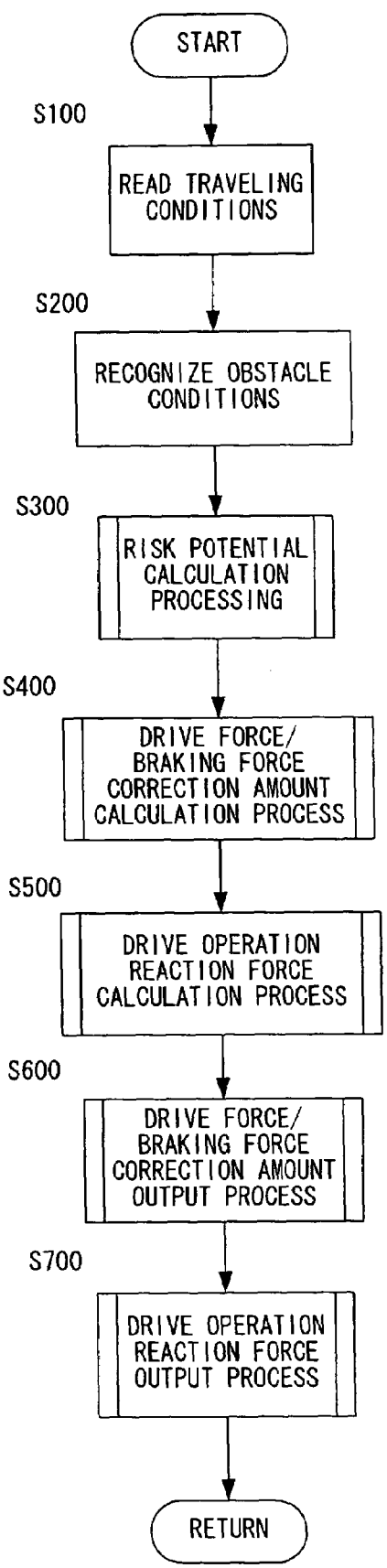
FIG. 8 is flow chart showing a processing sequence for a drive operation assist control program of the first embodiment.

The following is a detailed description of operations performed by the vehicle driving assist system 1 of the first embodiment. FIG. 8 shows a flowchart of a processing sequence for a drive operation assist control of the controller 50 of the first embodiment. The content of this processing is carried out continuously at fixed intervals of, for example, 50 msecs.

First, traveling conditions are read in in step S100. Here, traveling conditions corresponds to information relating to vehicle traveling conditions that include obstacle conditions to the front of the subject vehicle. In particular, the distance D to a front obstacle and the direction in which that obstacle exists detected by the laser radar 10 and the traveling speed Vh of the subject vehicle detected by the subject vehicle speed sensor 20 are read-in. The accelerator pedal operation amount SA and the brake pedal operation amount SB detected by the accelerator pedal stroke sensor 64 and the brake pedal stroke sensor 94 respectively are also read-in.

In step S200, conditions of the front obstacle are recognized based on traveling condition data read in and recognized in step S100. The relative position, direction of movement and movement speed of the obstacle with respect to the subject vehicle at this time point are determined using the relative position, direction of movement and movement speed of the obstacle with respect to the subject vehicle stored in memory of the controller 50 detected in the previous processings and the current traveling condition data obtained in step S100. The manner in which obstacles are arranged to the front of the subject vehicle with respect to the movement of the subject vehicle and their relative movement etc. are recognized.

In step S300, the risk potential RP with respect to the obstacle is calculated as shown in the following.

Figure 9A:
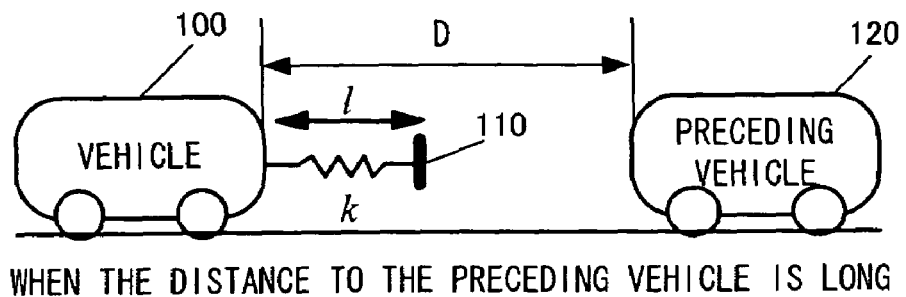
FIG. 9A and FIG. 9B illustrate the concept of drive force/braking force control.
Figure 9B:
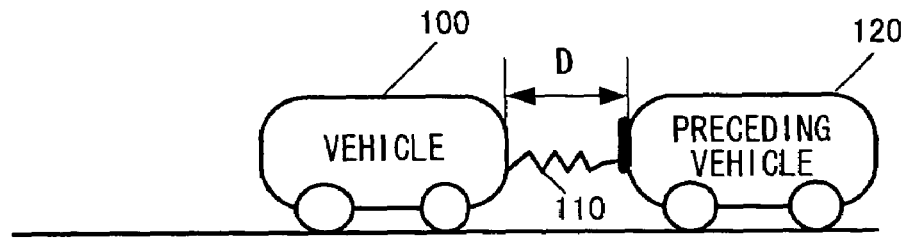

As shown in FIG. 9A, consideration is given to a model where it is assumed that a virtual resilient member 110 is provided at the front of a subject vehicle 100, and the virtual resilient member 110 comes into contact with and is compressed by a preceding vehicle 120, so that psuedo travel resistance is applied to the subject vehicle 110. The risk potential RP with respect to an obstacle, i.e., the preceding vehicle 120, is defined as the extent of compression of the virtual resilient member 110 in the event that the virtual resilient member 110 comes into contact with and is compressed by the preceding vehicle 120 as shown in FIG. 9B. The risk potential RP can be expressed by the following (Expression 1).

$$RP = l - D \qquad \text{(Expression 1)}$$

In (Expression 1), D is the distance between the subject vehicle 100 and the preceding vehicle 120, and l is the length of the virtual resilient member 110. The length l of the virtual resilient member 110 can be expressed by the following (Expression 2) based on the subject vehicle speed Vh and a control parameter Th set appropriately in advance.

$$l = Th \times Vh \qquad \text{(Expression 2)}$$

The control parameter Th is taken to be, for example, 1 sec. As shown in FIG. 9B, in the event that the subject vehicle distance D between the subject vehicle 100 and the preceding vehicle 120 is short, the distance D to the preceding vehicle 120 becomes shorter than the length l of the virtual resilient member 110 and the risk potential RP becomes large. In the event that the distance D is longer than the length l of the resilient member 110 the risk potential RP=0.

In step S400, the correction amounts for the drive force and the braking force are calculated based on the risk potential RP with respect to the obstacle calculated in step S300. The correction amounts of the drive force and braking force are defined as the psuedo travel resistance applied to the subject vehicle 100 when the virtual resilient member 110 comes into contact with and is compressed by the preceding vehicle 120. Namely, a restoring force of the virtual resilient member 110 when the inter-vehicle distance D is short and the virtual resilient member 110 is compressed as shown in FIG. 9B is calculated as the correction amounts of the drive force and braking force. The restoring force Fc of the virtual resilient member 110 is expressed by (Expression 3) in the following.

$$Fc = k \times RP \qquad \text{(Expression 3)}$$

In (Expression 3), k is a resilience constant for the virtual resilient member 110 and is a control parameter appropriately adjusted in advance to give appropriate control results.

The restoring force Fc becomes larger as the risk potential RP with respect to the preceding vehicle becomes higher, i.e., as the inter-vehicle distance D becomes smaller with respect to the length l of the virtual resilient member 110 as shown in (Expression 3).

Figure 10:
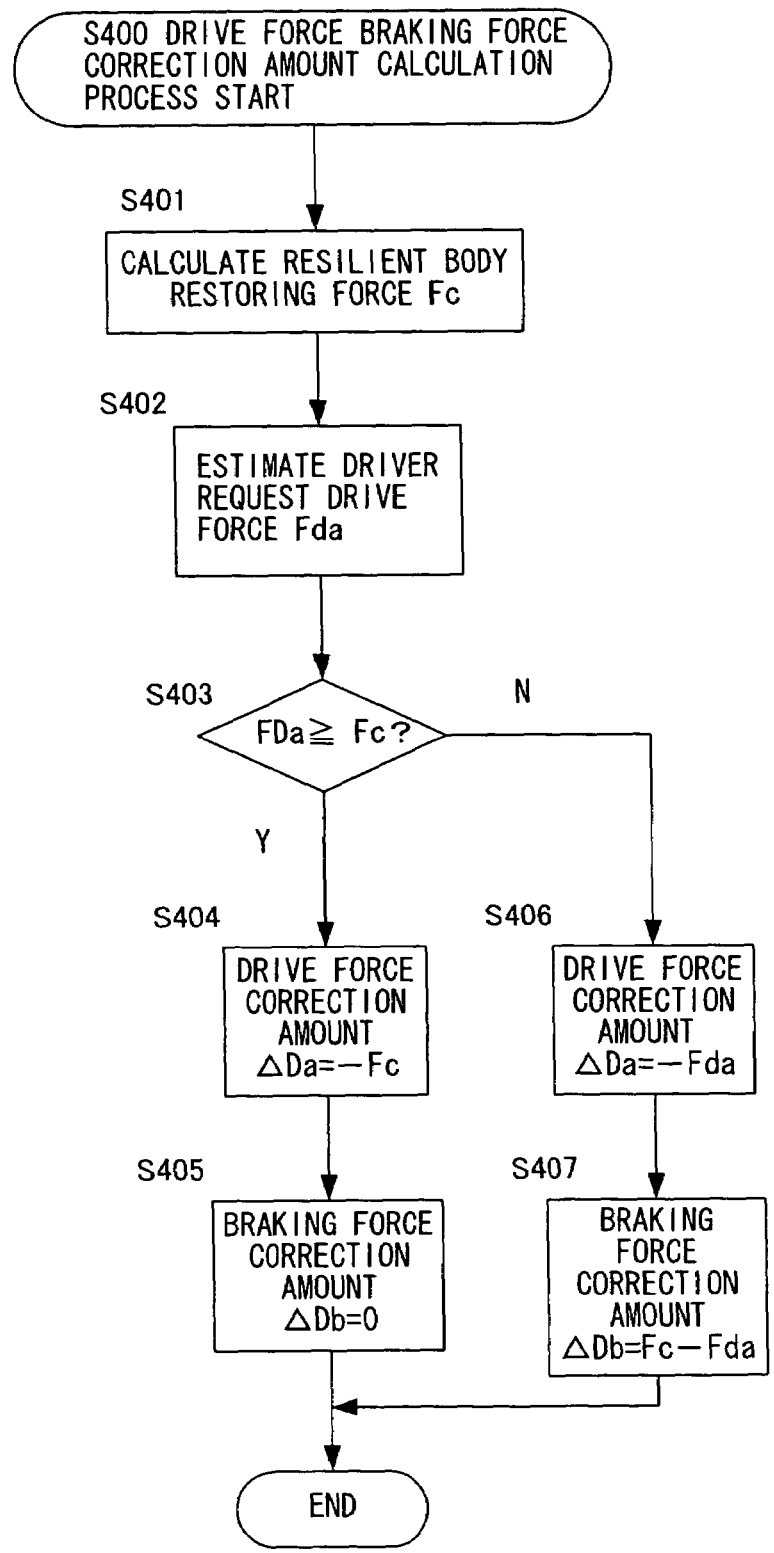
FIG. 10 is a flowchart illustrating drive force/braking force correction amount calculation processing.

In the following, a detailed description of the process for calculating the drive force and braking force correction amounts carried out in step S400 is given with reference to the flowchart of FIG. 10.

First, in step S401, the restoring force Fc of the resilient member provided virtually at the front of the subject vehicle is calculated using (Expression 3) described above. In step S402, the driver request drive force Fda is estimated. A map that is the same as the driver request drive force calculation map shown in FIG. 4 stored in the drive force control device 63 is also stored in the controller 50. The controller 50 then estimates the driver request drive force Fda according to the accelerator pedal operation amount SA in accordance with the map shown in FIG. 4.

In step S403, the restoring force Fc of the virtual resilient member calculated in step S401 and the driver request drive force Fda calculated in step S402 are compared to each other. In the event that the driver request drive force Fda is greater than or equal to the restoring force Fc (Fda≧Fc), step S404 is proceeded to. In step S404, −Fc is set as a drive force correction amount ΔDa, and in step S405, 0 is set as a braking force correction amount ΔDb. Namely, because Fda−Fc≧0, a positive drive force is still to be generated after correcting the drive force Fda using the restoring force Fc. Thus, the correction amount can be achieved only by the drive force control device 63. In this event, the vehicle behavior is in such a state that a drive force of the extent anticipated by the driver is not obtained regardless of the driver depressing the accelerator pedal 62. In the event that the drive force after correction is larger than the traveling resistance, the driver feels that the acceleration has become sluggish. In the event that the drive force after correction is smaller than the traveling resistance, on the other hand, the driver feels that the vehicle is decelerating.

On the other hand, in the event of a negative determination in step S403 where the driver request drive force Fda is smaller than the restoring force Fc (Fda<Fc), the target correction amount cannot be obtained with only the drive force control device 63. Thus, the processing proceeds to step S406. In step S406, the drive force correction amount ΔDa is set to −Fda, and in step S407, the shortfall in the correction amount (Fc−Fda) is taken to be the braking force correction amount ΔDb. In this event, the driver perceives that the vehicle is decelerating.

Figure 11:
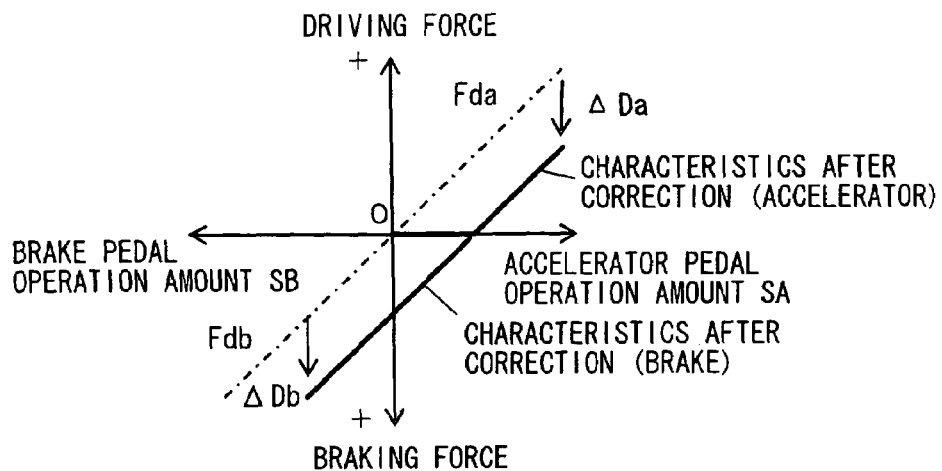
FIG. 11 illustrates drive force correction and braking force correction characteristics.

A view illustrating a method of correcting the drive force and the braking force is shown in FIG. 11. The horizontal axis of FIG. 11 shows the accelerator pedal operation amount SA and the brake pedal operation amount SB with the accelerator pedal operation amount SA becoming large as advancing from the origin 0 to the right, and the brake pedal operation amount SB becoming large as advancing to the left. The vertical axis of FIG. 11 shows the drive force and braking force, and shows drive force becoming larger upon advancement from the origin 0 upwards and shows braking force becoming larger upon advancement downwards.

In FIG. 11, the required drive force Fda corresponding to the accelerator pedal operation amount SA and the required braking force Fdb corresponding to the brake pedal operation amount SB are each shown by a one-dot chain line. Further, the drive force and braking force corrected according to the risk potential RP are each shown by a solid line.

In the event that the accelerator pedal operation amount SA is large and the required drive force Fda corresponding to the accelerator pedal operation amount SA is greater than or equal to the restoring force Fc, the drive force is corrected in a reduction direction according to the correction amount ΔDa. In the event that the accelerator pedal operation amount SA is small and the required drive force Fda corresponding to the accelerator pedal operation amount SA is smaller than the restoring force Fc, on the other hand, the drive force is corrected by setting the correction amount ΔDa in such a manner that no drive force is to be generated. Further, the difference between the restoring force Fc and the required drive force Fda is set as the correction amount ΔDb. As a result, a retarding action is carried out according to the accelerator pedal operation amount SA. The retarding action is achieved by applying a gentle braking to slow the vehicle down while the accelerator pedal 62 is still being operated.

When the brake pedal 92 is pushed down, the braking force is corrected in an increasing direction based on the correction amount ΔDb. As a result, the characteristic of the drive force and braking force is corrected in such a manner that the travel resistance applied to the subject vehicle is increased as a whole in accordance with the correction amounts, i.e., the restoring force Fc of the virtual resilient member.

Step S500 is advanced to after the drive force and braking force correction amounts are calculated in step S400.

In step S500, a reaction force control instruction value FA to be outputted to the accelerator pedal reaction force control device 60 and a reaction force control instruction value FB to be outputted to the brake pedal reaction force control device 90 are calculated based on the risk potential RP with respect to the preceding vehicle. Specifically, the reaction force control instruction values FA and FB corresponding to the drive force correction amount ΔDa and the braking force correction amount ΔDb calculated in step S400 are calculated respectively so that operation reaction force control is carried out at the same time as the drive force/braking force control.

Figure 12:
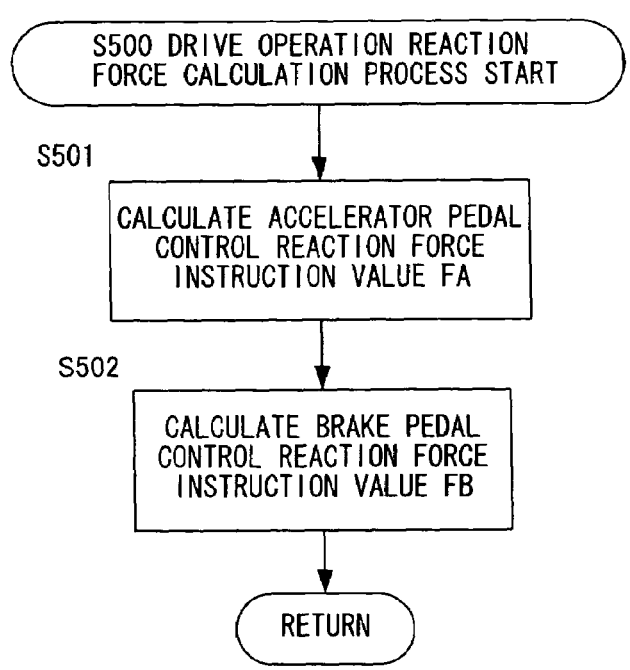
FIG. 12 is a flowchart illustrating operation reaction force calculation processing.

The operation reaction force calculation process of step S500 is described in detail using the flowchart of FIG. 12.

Figure 13:
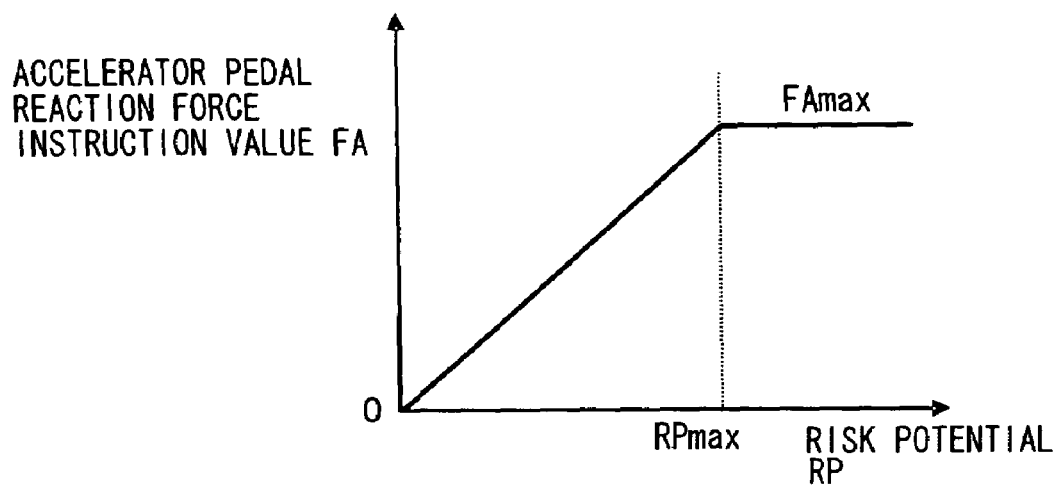
FIG. 13 is a map showing the relationship between risk potential and accelerator pedal control reaction force instruction value.

In step S501, the accelerator pedal reaction force control instruction value FA is calculated based on the risk potential RP according to the current obstacle conditions calculated in step S300. FIG. 13 shows a relationship between risk potential RP and accelerator pedal reaction force control instruction value FA. As shown in FIG. 13, in the event that the risk potential RP is smaller than a predetermined value RPmax, the accelerator pedal reaction force control instruction value FA is calculated in such a manner that a larger accelerator pedal reaction force is generated for a larger risk potential RP. In the event that the risk potential RP is larger than the predetermined value RPmax, the reaction force control instruction value FA is fixed at a maximum value FAmax to ensure that the maximum accelerator pedal reaction force is generated.

Figure 14:
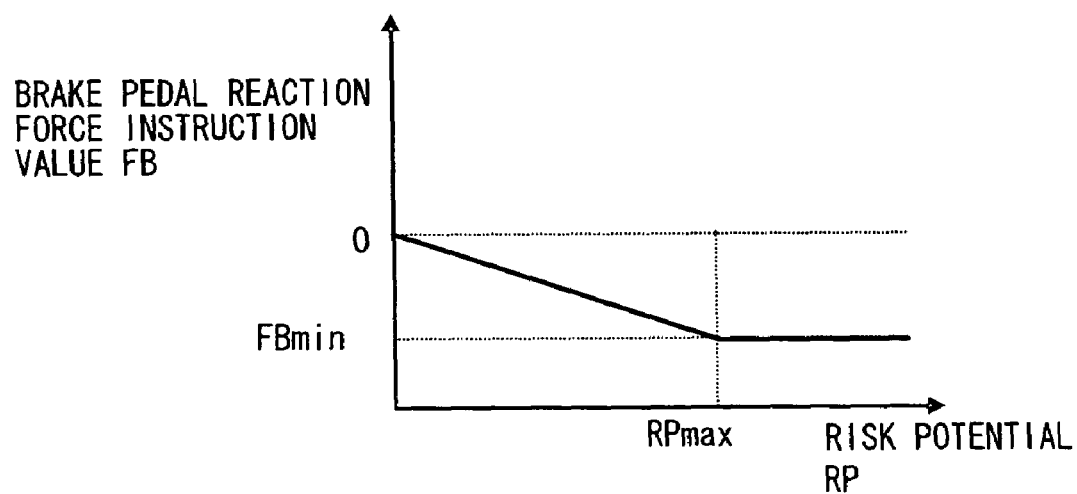
FIG. 14 is a map showing the relationship between risk potential and brake pedal control reaction force instruction value.

In step S502, the reaction force control instruction value FB is calculated based on the risk potential RP. FIG. 14 shows a relationship between risk potential RP and brake pedal reaction force control instruction value FB. As shown in FIG. 14, the reaction force control instruction value FB is calculated in such a manner that a smaller brake pedal reaction force, i.e. a larger brake assist force, is generated for a larger risk potential RP. When the risk potential RP is larger than the predetermined value RPmax, the reaction force control instruction value FB is fixed at a predetermined value FBmin to ensure that the minimum brake pedal reaction force is generated.

As shown in FIG. 13 and FIG. 14, in the event that the risk potential RP is smaller than the predetermined value RPmax, the accelerator pedal reaction force characteristics and the brake pedal reaction force characteristics are modified, and the driver is made aware of the magnitude of the current risk potential RP through the accelerator pedal reaction force. On the other hand, in the event that the risk potential RP is larger than the predetermined value RPmax, the accelerator pedal reaction force control instruction value FA is taken as a maximum, and the driver is invited to release the accelerator pedal 62. Moreover, the brake pedal reaction force control instruction value FB is taken as a minimum, and control is exerted so that the brake pedal 92 is easily depressed when the driver's operation is shifted to a braking operation.

Further, by calculating the drive force correction amount ΔDa and the braking force correction amount ΔDb, and the reaction force control instruction values FA and FB based on the current risk potential RP according to the current obstacle conditions, it is possible to simultaneously execute the drive force/braking force correction, accelerator pedal reaction force control and brake pedal reaction force control. As a result, the braking force correction amounts ΔDa and ΔDb generated at the subject vehicle at the current time are transmitted to the driver simultaneously as the accelerator pedal operation reaction force or the brake pedal operation reaction force. Because of this, the correction state of the drive force and the braking force of the subject vehicle, i.e. the subject vehicle control state can be made known to the driver in an indirect and intuitive manner as operation reaction force of the accelerator pedal 62 or the brake pedal 92 so as to give a sense of security.

Step S600 is proceeded to after calculating the reaction force control instruction values FA and FB in step S500.

In step S600, the drive force correction amount ΔDa and braking force correction amount ΔDb calculated in step S400 are outputted to the drive force control device 63 and the braking force control device 93, respectively. The drive force control device 63 calculates a target drive force from the drive force correction amount ΔDa and the required drive force Fda, and controls the engine controller 63c in such a manner that the calculated target drive force is generated. The braking force control device 93 calculates a target braking force from the braking force correction amount ΔDb and the required braking force Fdb, and controls the hydraulic brake pressure controller 93c in such a manner that the target brake force is generated.

In step S700, the accelerator pedal reaction force control instruction value FA and the brake pedal reaction force control instruction value FB calculated in step S500 are outputted to the accelerator pedal reaction force control device 60 and the brake pedal reaction force control device 90, respectively. The accelerator pedal reaction force control device 60 and the brake pedal reaction force control device 90 control the accelerator pedal reaction force and the brake pedal reaction force according to instruction values inputted from the controller 50.

In the first embodiment described above, the following operational effects can be achieved.

(1) The controller 50 calculates the risk potential RP with respect to the obstacle based on the obstacle conditions in the vehicle surroundings. Then, the controller 50 controls the operation reaction force generated at an operation device through which a travel command is issued, such as the accelerator pedal 62 and the brake pedal 92, and controls drive torque or drive force occurring at the subject vehicle to be reduced based on the calculated risk potential RP. By carrying out control of operation reaction force according to risk potential of the vehicle surroundings, it is possible to provide appropriate assistance to the driver in operations for accelerating and decelerating the subject vehicle. By reducing drive torque as the risk potential RP becomes larger, it is possible to provide alerts to a driver through a feeling that an acceleration is reduced or through a feeling of deceleration. Moreover, the controller 50 carries out operation reaction force control according to the extent of correction of the drive torque, and thus the driver is enabled to perceive in an indirect and intuitive manner the drive torque correction amount as operation reaction force of the drive operation device. It is therefore possible to give the driver a sense of security because the driver can understand the control state of the subject vehicle.

(2) The controller 50 calculates the current risk potential RP based on the current obstacle conditions for the vehicle surroundings, and calculates the drive torque correction amount ΔDa and the operation reaction force control instruction values FA and FB based on the calculated current risk potential RP. By calculating the drive torque correction value ΔDa and the operation reaction force control instruction values FA and FB from the same risk potential RP, operation reaction force corresponding to the correction amount ΔDa of the drive torque is generated, and the driver can be made aware of the control sate of the subject vehicle at the current time in an indirect and intuitive manner.

(3) The controller 50 calculates the drive torque correction amount ΔDa and the operation reaction force control instruction values FA and FB based on the current risk potential RP. In the event that the risk potential RP is large, the relationship of the drive torque with respect to the accelerator pedal operation amount SA is corrected in the direction of reduction by the drive torque correction amount ΔDa as shown in FIG. 11. As a result, the feeling of acceleration anticipated by the driver is not obtained when operating the accelerator pedal, and a feeling of reduction of the acceleration of the subject vehicle or a feeling of deceleration is provided to the driver as an alarm. As shown in FIG. 11, when the driver further depresses the accelerator pedal 62, the accelerator pedal operation amount SA is increased so that the drive torque is also increased. Namely, even in the event that drive torque correction control is carried out with the risk potential RP being large, the drive torque is allowed to increase in response to operation of the accelerator pedal performed by the driver. It is therefore possible to ensure a degree of freedom in the acceleration operation due to the intention of the driver. Further, by calculating the control amount corresponding to the drive torque correction amount ΔDa as the operation reaction force control instruction values FA and FB, and carrying out operation reaction force control at the same time as correction control of the drive torque, it is possible for a driver to perceive the degree of reduction in the drive torque at the current time indirectly as the operation reaction force generated at the accelerator pedal 62 or the brake pedal 92.

(4) The controller 50 corrects the relationship of the braking torque with respect to the brake pedal operation amount SB according to the current risk potential RP in the direction of increasing. As a result of this, when the driver performs a brake pedal operation in the event that the risk potential RP is high, braking force increased by the braking force correction amount ΔDb is generated, and appropriate assistance is provided to the driver in the deceleration operation.

(5) In the event that the accelerator pedal operation amount SA is smaller than a predetermined value, a retarding action is carried out, that is, a gentle braking is applied according to the accelerator pedal operation amount SA. Specifically, in the event that the driver request drive force Fda corresponding to the accelerator pedal operation amount SA is smaller than the restoring force Fc of the virtual resilient member, the difference (Fc−Fda) between the restoring force Fc and the required drive force Fda is outputted to the braking force control device 93 as the braking force correction amount ΔDb. As a result of this, it is possible to provide assistance to the driver for the driving operation even in cases where the drive force corresponding to the accelerator pedal operation amount SA is small.

(6) It is possible to arouse the attention of the driver in a reliable way since the accelerator pedal operation reaction force is made larger with the current risk potential RP of the vehicle surroundings becoming larger.

(7) The brake pedal operation reaction force becomes smaller as the current risk potential RP for the vehicle surroundings becomes larger. It is therefore possible for the driver to be assisted in a deceleration operation while the driver is operating the brake pedal.

Second Embodiment

The following is a description of a vehicle driving assist system of a second embodiment of the present invention. The configuration for the vehicle driving assist system of the second embodiment is the same as for the first embodiment shown in FIG. 1 and FIG. 2. Description here will mainly focus on points of difference from the first embodiment.

In the second embodiment, a determination is made as to whether or not a subject vehicle can evade a front obstacle through a steering operation or a braking operation, and drive force/braking force correction amounts are decided based on the results of this determination. Namely, automatic braking control generating braking force automatically is carried out based on the results of the determination as to the possibility of evasion.

Figure 15:
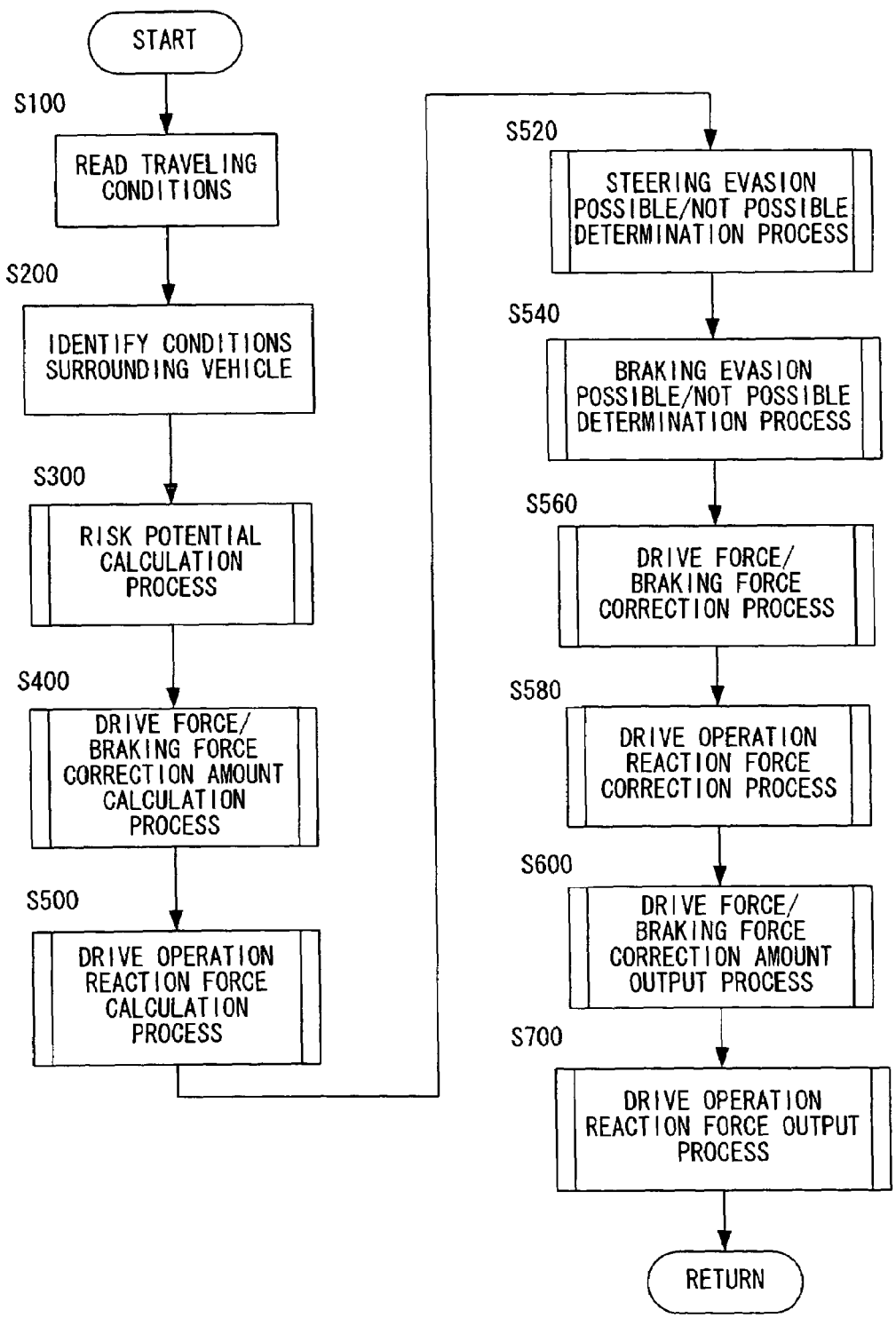
FIG. 15 is flow chart showing a processing sequence for a drive operation assist control program of the second embodiment.

The following is a detailed description of operations of the vehicle driving assist system of the second embodiment. FIG. 15 shows a flowchart of a processing sequence for a drive operation assist control of the controller 50 of the second embodiment. The content of this processing is carried out continuously at fixed intervals of, for example, 50 msecs.

The processing of step S100 to step S500 is the same as step S100 to step S500 of the flowchart of FIG. 8 described in the first embodiment and description thereof is therefore omitted.

In step S520, a determination is made as to whether or not the front obstacle can be evaded as a result of steering the subject vehicle based on the condition of the front obstacle recognized in step S200. In particular, a lateral movement distance y which is necessary for the subject vehicle to move in order to avoid the front obstacle is calculated and then a determination is made as to whether or not evasion is possible through steering. In the event that it is possible to evade the front obstacle as a result of steering the subject vehicle to either the left or right, it is determined that evasion through steering is possible, and automatic braking control is not adopted.

Figure 16:
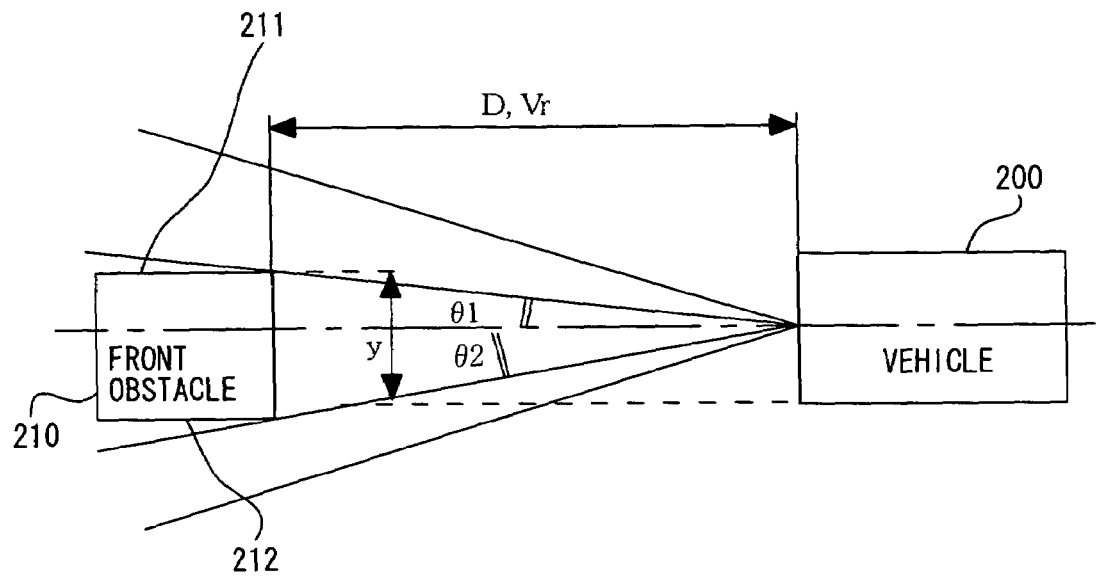
FIG. 16 shows the positional relationship between a front obstacle and a subject vehicle in the event of using scanning-method laser radar as a front detection device.

The positional relationship between a subject vehicle 200 and a front obstacle or a preceding vehicle 210 is shown in FIG. 16. As shown in FIG. 16, angles of a right end 211 and left end 212 of the preceding vehicle 210 with respect to the longitudinal centerline of the subject vehicle 200 are taken to be θ1 and θ2 respectively. In the event that the preceding vehicle 210 can be avoided to either the right direction of the angle of θ1 or the left direction of the angle of θ2, the direction with the smaller angle θ1 is selected. The lateral movement distance y necessary in order to avoid the preceding vehicle 210 through steering the subject vehicle 200 in the direction θ1 is then calculated. The lateral movement distance y can be calculated from the following (Expression 7).

$$y = D \times \sin(\theta 1) + lw/2 \quad \text{(Expression 7)}$$

In (Expression 7), D is the distance between the vehicles, and lw is the width of the subject vehicle.

An example is described here where the laser radar 10 is fitted to the center of the subject vehicle. In the event that the laser radar 10 is fitted so as to be offset from the center of the subject vehicle to either the left or the right, the extent of the offset of the fitting position of the laser radar 10 is appropriately added or subtracted in (Expression 7).

Figure 17:
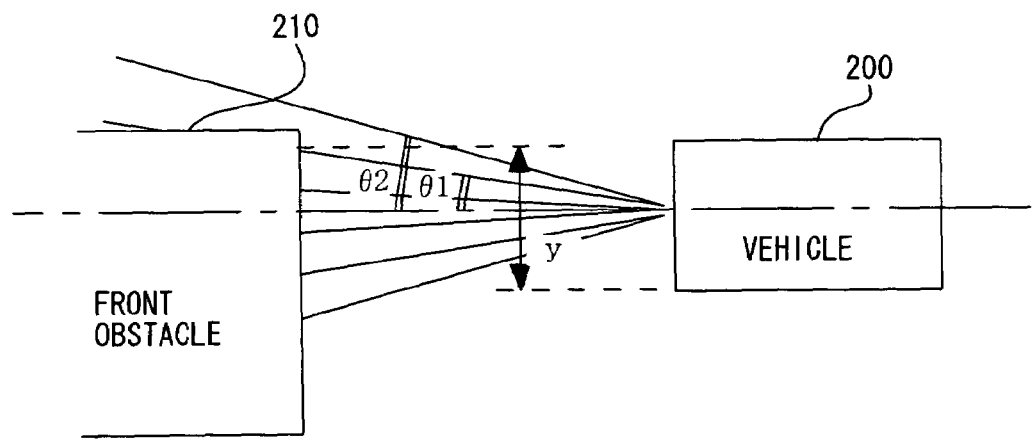
FIG. 17 shows the positional relationship between a front obstacle and a subject vehicle in the event of using a multiple beam-method laser radar as a front detection device.

In the event of using a detector to detect a front obstacle using a plurality of beams of prescribed widths, the direction of the preceding vehicle 210 as shown in FIG. 17 can be detected within a range θ1 to θ2 of a certain width. In this event, the necessary lateral movement distance y for evasion, taking the minimum angle θ1 of the range θ1 to θ2 as the direction of the preceding vehicle 210, is calculated using (Expression 7) described above. In this case also, in the event that the radar is fitted so as to be offset from the center of the subject vehicle to either the left or the right, the extent of the offset of the fitting position of the laser radar 10 is appropriately added or subtracted in (Expression 7).

By calculating the amount of lateral movement y necessary for evasion through steering in the aforementioned method, even in cases where the offset amount of an obstacle with respect to a subject vehicle, i.e. even in cases where the relative positions of the subject vehicle and the preceding vehicle in a lateral direction are different, it is possible to calculate the lateral movement distance y necessary for evasive steering in any relative positions. It is therefore possible to reliably determine whether or not evasion through steering is possible.

Further, a time ty necessary for the subject vehicle to move in a lateral direction by the lateral movement distance y necessary to evade the preceding vehicle is calculated. The steering characteristics of the subject vehicle can be expressed by (Expression 8) and (Expression 9) in the following.

$$m \times v \times (r + d\beta/dt) = 2Yf + 2Yr \quad \text{(Expression 8)}$$

$$Iz \times dr/dt = 2lf \times Yf - 2lr \times Yr \quad \text{(Expression 9)}$$

In (Expression 8) and (Expression 9),
m: vehicle weight
Iz: moment of inertia in the yaw direction of the subject vehicle
v: vehicle speed
r: yaw rate
β: vehicle slip angle
lf: distance from vehicle center of gravity to front wheel
lr: distance from vehicle center of gravity to rear wheel
Yf and Yr in (Expression 8) and (Expression 9) represent a side force generated at the front wheel and rear wheel respectively, and can be expressed by (Expression 10) and (Expression 11) in the following.

$$Yf = Ff\{\beta + (lf/v) \times r - \theta f\} \quad \text{(Expression 10)}$$

$$Yr = Fr\{\beta - (lr/v) \times r\} \quad \text{(Expression 11)}$$

Figure 18:
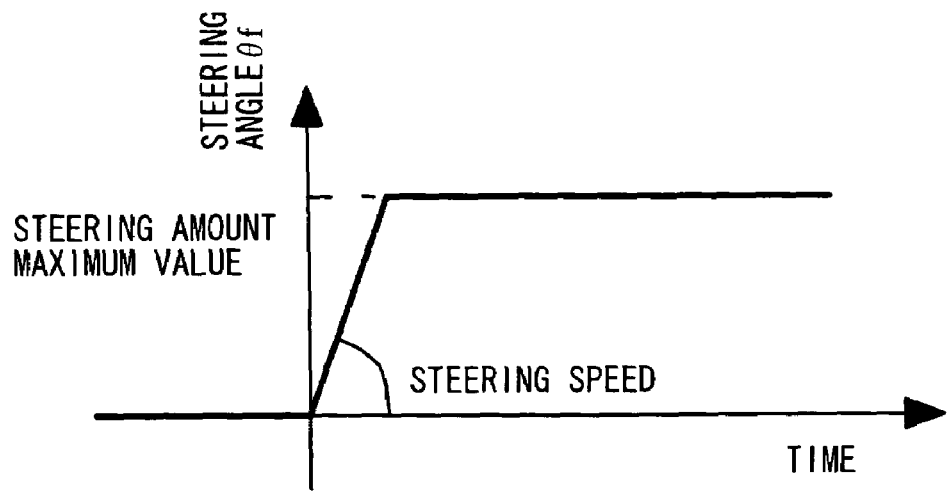
FIG. 18 is a view showing driver steering characteristics at the time of an emergency.

In (Expression 10) and (Expression 11), θf is front wheel steering angle. Assuming that at times of emergency the driver steers by a maximum steering amount at a steering speed shown in FIG. 18, a front wheel steering angle θf is set in accordance with the characteristic shown in FIG. 18.

Figure 19:
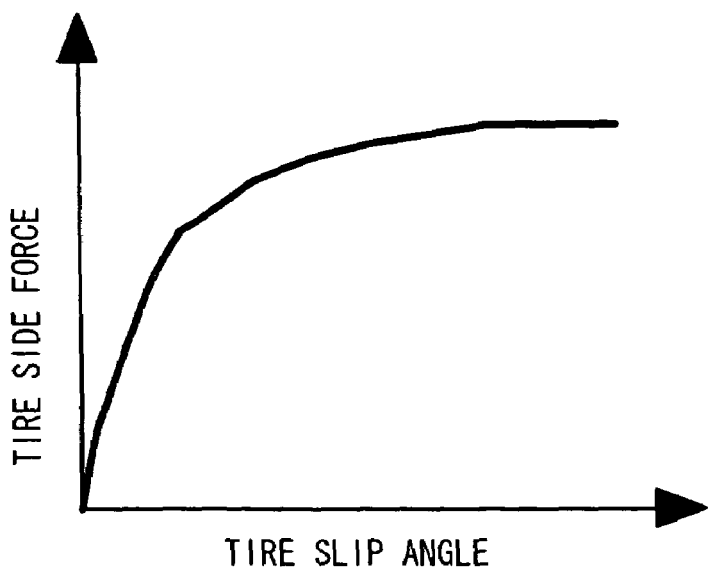
FIG. 19 is a view showing lateral force generated with respect to tire slip angle.

Ff and Fr in (Expression 10) and (Expression 11) are functions expressing a side force generated with respect to a tire slip angle, and are defined by the relationship shown in FIG. 19.

At this time, the lateral movement distance y is expressed as shown in (Expression 12) in the following.

$$y = \int v \times \sin(\int r \times dt + \beta) dt \quad \text{(Expression 12)}$$

By solving (Expression 8) to (Expression 12) above, it is possible to calculate the time ty necessary for the subject vehicle to move laterally by the lateral movement distance y required to avoid the front obstacle.

Figure 20:
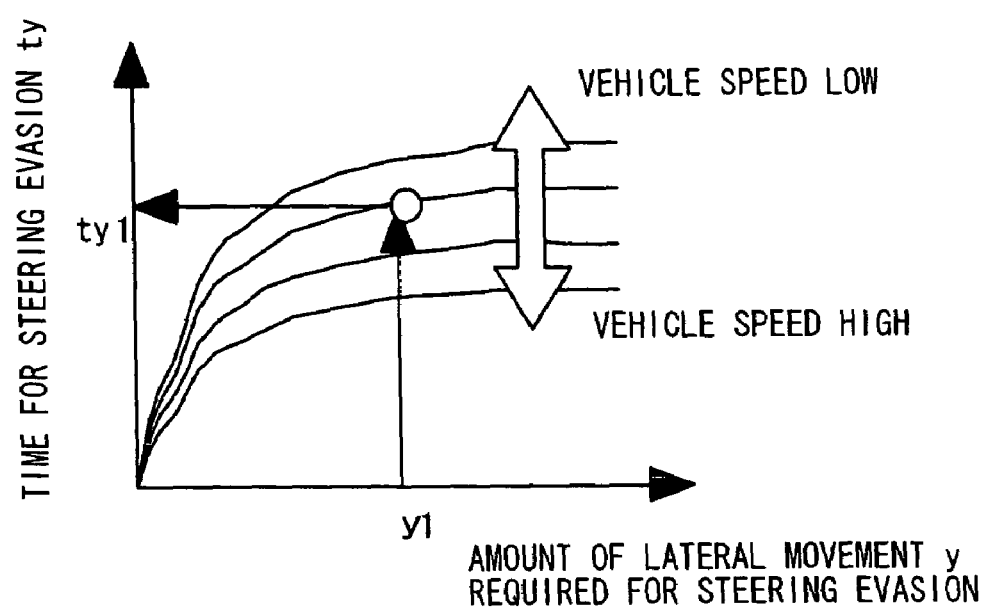
FIG. 20 shows a relationship between a lateral movement distance necessary for steering evasion and necessary time.

It is very time-consuming to execute the operation of (Expression 8) to (Expression 12) online and this operation is therefore carried out off-line in advance, with the results then being mapped in the manner shown in FIG. 20. In FIG. 20, an example is shown where the time ty necessary for evasive steering is ty1 in the event that the lateral movement distance y necessary to evade a front obstacle is y1. This necessary time ty becomes shorter as the subject vehicle speed becomes faster, and longer as the subject vehicle speed becomes slower.

In the event of calculating the time ty necessary to move in the lateral direction by the lateral distance y necessary for evasion, this calculation takes place with reference to the map for the subject vehicle speed v and lateral movement distance y shown in FIG. 20.

The time ty for lateral movement calculated in this manner is compared with an estimated period of time D/Vr until the subject vehicle and the front obstacle make contact. In the event that the estimated time D/Vr until contact is smaller than the time ty for lateral movement (D/Vr<ty), it is determined that evasive action through steering is not possible.

As described above, because the time ty for evasive steering is calculated taking into consideration differences in the steering characteristics of vehicles, it is possible to reliably calculate whether or not a front obstacle cane be evaded regardless of differences in steering characteristics from vehicle to vehicle and steering characteristics that differ in vehicle speed range. Moreover, as the characteristics of driver's steering operation at the time of emergencies is also take into account in calculating the vehicle steering evasion time ty, it is possible to calculate steering evasion time ty at the time of emergencies in a more accurate manner.

After the possibility of evasion through steering is determined in this manner in step S520, step S540 is proceeded to.

In step S540, it is determined whether or not evasion is possible by braking. Specifically, it is determined that it is not possible to evade the front obstacle through braking when the distance D between the subject vehicle and the front obstacle and the relative velocity Vr recognized in step S200 meet the following (Expression 13).

$$D < -Vr \times Td + Vr^2/2a \qquad \text{(Expression 13)}$$

In (Expression 13), time Td is idle time until a reduction in speed is achieved after driver starts operating the brake, and is taken to be, for example, Td=0.2 seconds. a is deceleration generated by the braking operation of the driver and is taken to be, for example, a=8.0 m/s$^2$.

Figure 21:
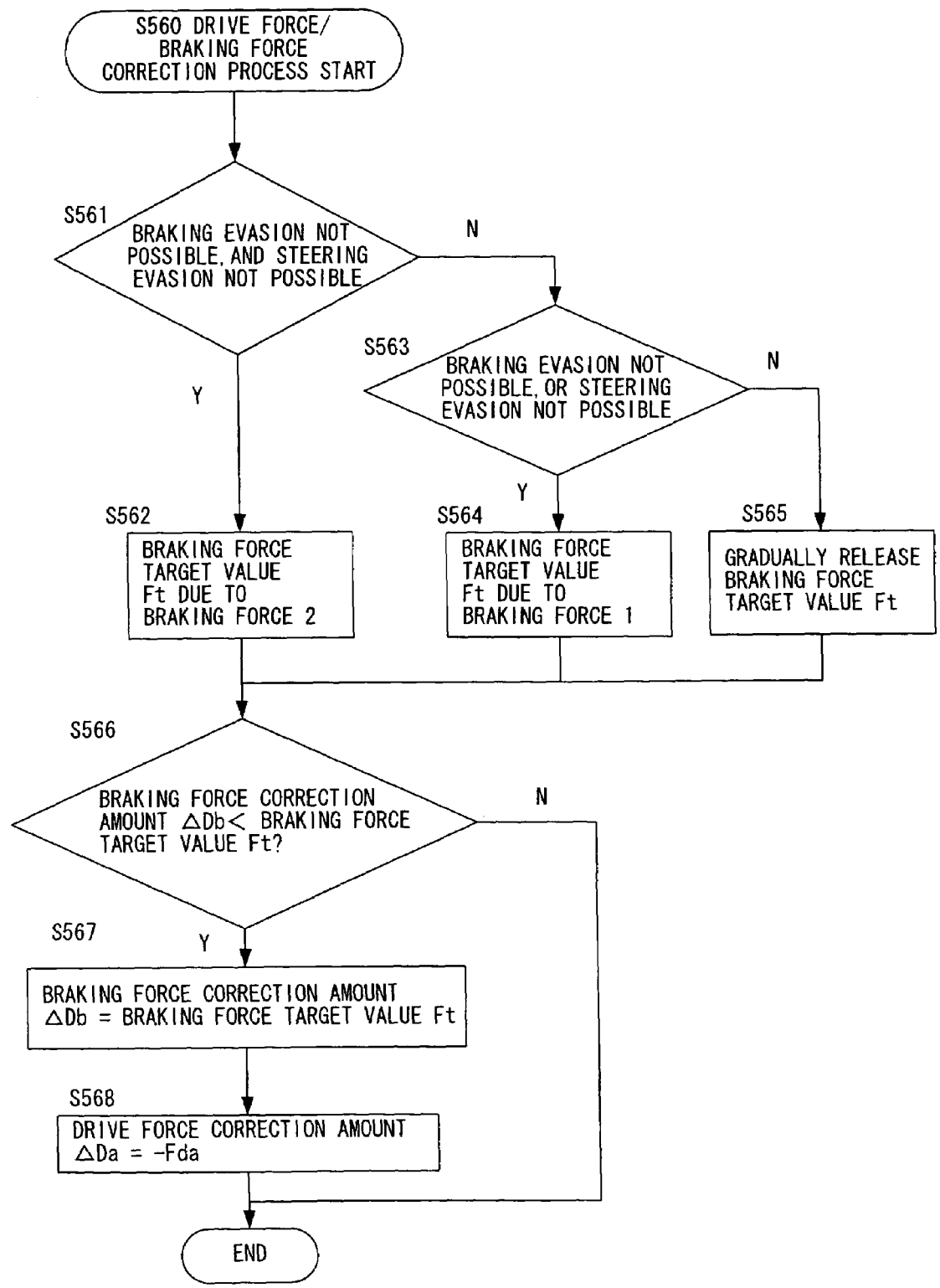
FIG. 21 is a flow chart illustrating drive force/braking force correction processing.

In step S560, the drive force correction amount and the braking force correction amount calculated in step S400 are corrected based on the possibility of steering evasion determined in step S520 and the possibility of braking evasion determined in step S540. The processing carried out in step S560 is now described using the flowchart in FIG. 21.

Figure 22:
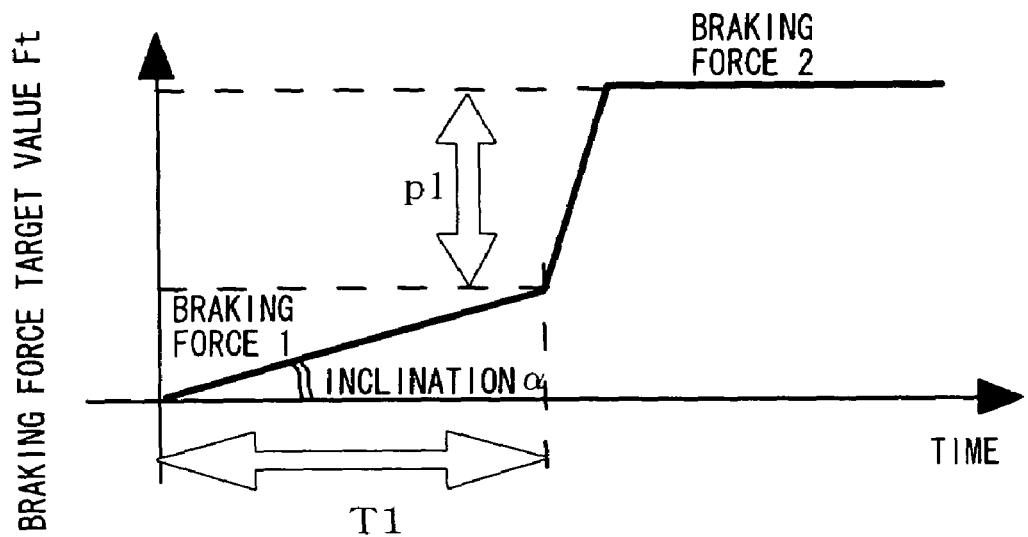
FIG. 22 is a view showing braking force 1 and braking force 2.

In step S561 it is determined whether or not the front obstacle can be evaded by neither braking nor steering. When it is determined that evasion by braking is not possible and evasion by steering is not possible, step S562 is proceeded to. In step S562, a braking force target value Ft is calculated using a braking force 2 shown in FIG. 22. Specifically, the braking force target value Ft is calculated so as to reach the braking force 2 set in advance at a predetermined inclination as shown in FIG. 22.

When there is a negative determination in step S561, step S563 is proceeded to, and it is determined whether or not evasion of the front obstacle is possible using braking or steering. When it is determined that it is not possible to evade the front obstacle by one of braking and steering, step S564 is proceeded to. In step S564, a braking force target value Ft is calculated using a braking force 1 shown in FIG. 22. Specifically, the braking force 1 smaller than the braking force 2 is calculated as the braking force target value Ft. The braking force 1 becomes gradually larger at a fixed inclination of α. The inclination α of the braking force 1 is calculated such that a difference p1 between the braking force 1 and the braking force 2 is less than a predetermined value when shifting from a state where the braking force 1 is applied to a state where the braking force 2 is applied. The inclination α is calculated in the following manner.

First, a time T1 from the start of application of the braking force 1 to when the braking force 2 starts acting is estimated. In the event that evasion of the front obstacle by steering becomes impossible while the evasion by braking is already impossible, the time T1 can be expressed in the following (Expression 14) using the time for lateral movement ty necessary for evasion by steering.

$$T1 = D/Vr - ty \qquad \text{(Expression 14)}$$

In the event that evasion of the front obstacle by braking becomes impossible while the evasion by steering is already impossible, the time T1 can be expressed in the following (Expression 15).

$$T1 = -(D - Vr^2/2a + Vr \times Td)/Vr \qquad \text{(Expression 15)}$$

In (Expression 15), Td is idle time until the brake starts functioning after the driver's braking operation, and "a" is deceleration generated by the braking operation.

The inclination α of the braking force 1 can be calculated from (Expression 16) in the following using the time T1 calculated in the above manner and the difference p1 between the braking force 2 and the braking force 1. The difference p1 of the braking force used here is set to an appropriate value in advance.

$$\alpha = p1/T1 \qquad \text{(Expression 16)}$$

In the event that a negative determination is made in step S563 and both evasion by braking and evasion by steering are possible, step S565 is proceeded to. In step S565, the set braking force target value Ft is gradually made smaller at a prescribed gradient until the braking force target value Ft becomes 0.

Figure 23:
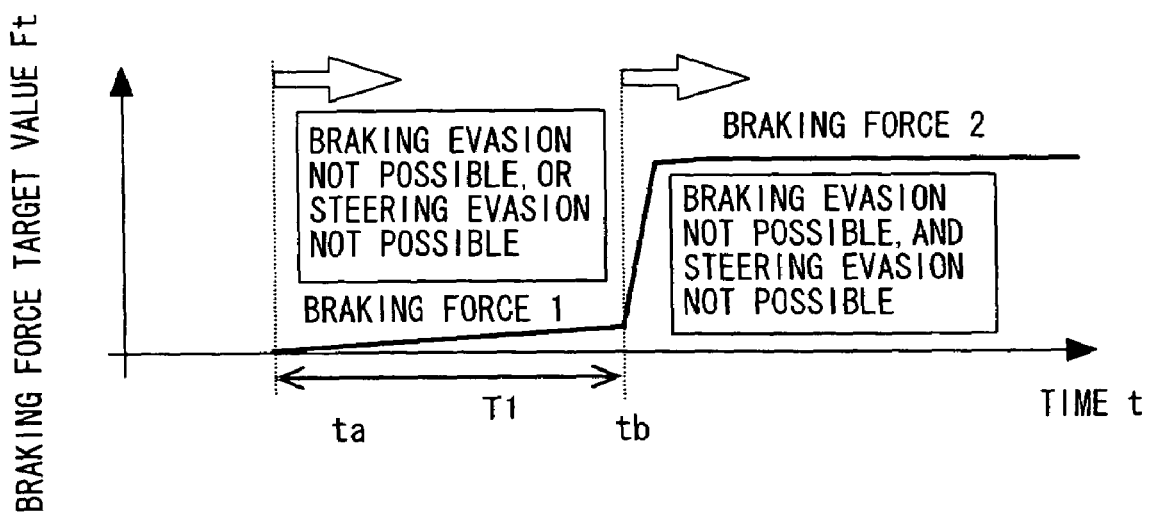
FIG. 23 is a view showing change in brake force target value as a time series.

Change in time series of the braking force target value Ft is shown in FIG. 23. When it is determined at a time point t=ta that the evasion of a front obstacle by one of braking and steering is not possible, the braking force target value Ft is gradually made larger from 0 in accordance with the braking force 1. When it is determined that evasion is possible by neither braking nor steering at a time point t=tb after a time T1 has elapsed from the time point t=ta, the braking force target value Ft increases at a prescribed inclination to the braking force 2, and dramatic braking is carried out by shifting from the braking force 1 to the braking force 2.

Next, in step S566, it is determined whether or not the braking force correction amount ΔDb calculated in step S400 is smaller than the braking target value Ft calculated in step S562, S564 or S565. In the event that the braking force correction amount ΔDb is smaller than the braking force target value Ft (ΔDb<Ft), step S567 is proceeded to. In step S567, and the braking force target value Ft is set as the braking force correction amount ΔDb. Next, in step S568, in order to put the driving force to 0, a value −Fda corresponding to the accelerator pedal operation amount SA is set as the driving force correction amount ΔDa. When a negative determination is made in step S566, the braking force correction amount ΔDb and the driving force correction amount ΔDa calculated in step S400 are used as they are.

Figure 24:
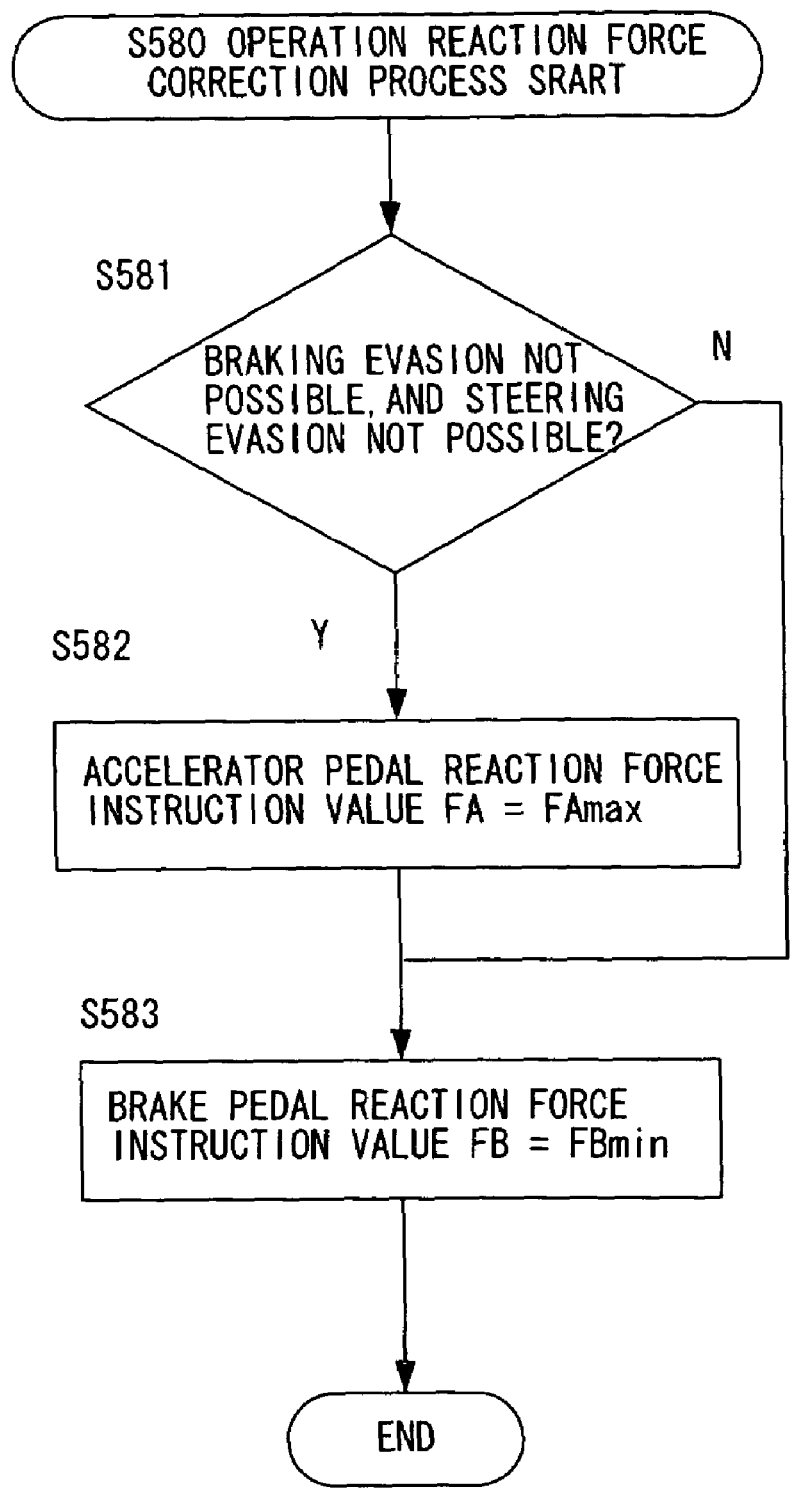
FIG. 24 is a flowchart illustrating operation reaction force correction processing.

After the drive force correction amount ΔDa and braking force correction amount ΔDb are corrected in step S560, step S580 is proceeded to. In step S580, correction of operation reaction force is carried out according to the possibility of steering evasion determined in step S520 and the possibility of braking evasion determined in step S540. This processing is described according to the flowchart shown in FIG. 24.

In step S581, it is determined whether or not the evasion of the front obstacle by steering is not possible and the evasion by braking is also not possible based on the possibility of steering evasion and possibility of braking evasion determined as described above. In the event that evasion of the front obstacle is not possible by either steering or braking, step S582 is proceeded to. In step S582, the accelerator pedal reaction force control instruction value FA is set to the maximum value FAmax so that maximum accelerator pedal reaction force is generated. In step S583, the brake pedal reaction force control instruction value FBmin is set to the predetermined value FBmin so that the minimum brake pedal reaction force is generated.

In the event that a negative determination is made in step S581 is determined to be negative and the front obstacle can be avoided by either steering or braking, the reaction force control instruction values FA and FB calculated in step S500 are used without correction.

Step S600 is proceeded to after the operation reaction force control instruction values are corrected in step S580. In step S600, the reaction force control instruction values FA and FB corrected in step S580 are outputted to the accelerator pedal reaction force control device 60 and the brake pedal reaction force control device 90 respectively, and accelerator pedal reaction force control and brake pedal reaction force control are carried out. In step S700, the drive force correction amount ΔDa and the braking force correction amount ΔD b corrected in step S560 are outputted to the drive force control device 63 and the braking force control device 93 respectively, and drive force control and braking force control are carried out. This terminates the processing for this time.

As described above in the second embodiment, the following operational effects are also obtained in addition to the results for the first embodiment described above.

(1) The controller 50 then determines the possibility of evasion of the obstacle. When it is determined that the subject vehicle cannot evade the obstacle, the controller 50 controls the braking force control device 93 so that automatic braking is carried out. In this way, the subject vehicle is automatically decelerated, and it is possible for the influence of unexpected situations to be alleviated.

(2) The controller 50 then determines whether or not the obstacle can be avoided as a result of only braking the vehicle, and whether or not the obstacle can be avoided as a result of only steering the subject vehicle. In the event that the obstacle cannot be avoided by using only one of braking and steering, automatic braking is carried out. In this way, in the event that it is predicted that the hazard cannot be avoided, automatic braking is carried out and the influence of unexpected situations can be alleviated. Further, as shown in FIG. 23, when a situation where an obstacle cannot be avoided by one of braking and steering is shifted to a situation where the obstacle cannot be avoided either by braking or steering, the braking target value Ft is increased from the braking force 1 to the braking force 2. In this way, the braking force is increased so that dramatic braking takes place automatically and, as a result, the influence even of unexpected situations can be alleviated.

(3) In the event that it is predicted that the obstacle cannot be avoided, the operation reaction force control instruction values FA and FB are corrected to predetermined values FAmax and FBmin. The driver is then alerted with a warning and is invited to decrease speed.

In the second embodiment, reaction force control instruction values FA and FB are corrected to predetermined values FAmax and FBmin according to the possibility of evasion of the front obstacle in the processing of step S580. This is, however, by no means limiting, and the reaction force control instruction values FA and FB calculated in step S500 can be used without correction according to the possibility of contact.

In the first embodiment described above, reaction force control and drive force/braking force control is carried out according to current risk potential RP. However, it is also possible just for reaction force control and drive force control to be carried out. Specifically, in the event that the inter-vehicle distance D between the subject vehicle and the preceding vehicle is short and the risk potential RP is currently high, when the accelerator pedal 62 is operated, correction is carried out so that drive force is lowered without carrying out the correction of the braking force. In this case also, reaction force control is carried out according to the risk potential RP, and the drive force correction amount ΔDa can be made known to the driver in real time as change in accelerator pedal reaction force or brake pedal reaction force.

Further, in the second embodiment, reaction force control and drive force/braking force control is carried out according to the current risk potential RP and automatic braking control is carried out according to the possibility of evasion of a front obstacle. However, it is also possible to not carry out braking force control according to the current risk potential RP. For example, in the event that the current risk potential RP is high, the drive force correction amount ΔDa is appropriately set so as to reduce the drive force, and when the evasion of the obstacle becomes impossible, the braking force target value Ft is appropriately set so as to increase the braking force.

In the first and second embodiments described above, both accelerator pedal reaction force control and brake pedal reaction force control are carried out according to the current risk potential RP of the vehicle surroundings. This is, however, by no means limiting, and it is also possible to carry out one of accelerator pedal reaction force control and brake pedal reaction force control.

In the first and second embodiments described above, rather than using the laser radar 10 to detect obstacles surrounding the subject vehicle, it is also possible, for example, to employ milliwave radar of other methods, or use a CCD camera or CMOS camera.

The above described embodiments are examples, and various modifications can be made without departing from the spirit and scope of the invention.

The disclosure of the following priority application is herein incorporated by reference:

Japanese patent application no. 2003-363673 filed Oct. 23, 2003

What is claimed is:

1. A vehicle driving assist system comprising:
an obstacle detection device that detects an obstacle in vehicle surroundings;
a risk potential calculation device that calculates a risk potential of a subject vehicle with respect to the obstacle based on detection results of the obstacle detection device;
a drive torque correction device that reduces drive torque generated at the subject vehicle, based on the risk potential calculated by the risk potential calculation device; and
a reaction force control device that controls reaction force generated at an operation device through which a travel command for the subject vehicle is issued according to a correction amount for the drive torque to be reduced by the drive torque correction device.

2. The vehicle driving assist system according to claim 1, wherein:
the drive torque correction device comprises a drive torque correction amount calculation device that calculates the correction amount for the drive torque based on a current risk potential calculated by the risk potential calculation device, and the reaction force control device comprises a reaction force calculation device that calculates a control amount of the reaction force based on the current risk potential.

3. The vehicle driving assist system according to claim 1, wherein:
the reaction force control device controls the reaction force simultaneously as the drive torque correction device controls the drive torque.

4. A vehicle driving assist system comprising:
an obstacle detection device that detects an obstacle in vehicle surroundings;
a risk potential calculation device that calculates a current risk potential of a subject vehicle with respect to the obstacle based on detection results of the obstacle detection device;
an accelerator pedal operation amount detection device that detects an operation amount of an accelerator pedal;
a drive torque correction device that corrects a relationship of drive torque with respect to the accelerator pedal operation amount in a reduction direction based on the current risk potential calculated by the risk potential calculation device;
an engine control device that controls an engine to generate the drive torque calculated by the drive torque correction device;
a reaction force calculation device that calculates a reaction force to be generated at an operation device through which a travel command for the subject vehicle is issued based upon the current risk potential calculated by the risk potential calculation device; and
a reaction force generation device that generates the reaction force calculated by the reaction force calculation device.

5. The vehicle driving assist system according to claim 4, further comprising:
a brake pedal operation amount detection device that detects an operation amount of a brake pedal;
a brake control device that generates braking torque according to the brake pedal operation amount; and
a braking torque correction device that corrects a relationship of the braking torque with respect to the brake pedal operation amount in an increasing direction based on the current risk potential calculated by the risk potential calculation device.

6. The vehicle driving assist system according to claim 5, wherein:
the brake control device carries out a retarding action according to the accelerator pedal operation amount in the event that the accelerator pedal operation amount is smaller than a predetermined value.

7. The vehicle driving assist system according to claim 4, further comprising:
an evasion determination device that determines a possibility that the subject vehicle evades the obstacle based on the detection results of the obstacle detection device; and
an automatic braking control device that controls a brake control device to carry out automatic braking when the evasion determination device determines that the obstacle cannot be evaded.

8. The vehicle driving assist system according to claim 5, further comprising:

an evasion determination device that determines a possibility that the subject vehicle evades the obstacle based on the detection results of the obstacle detection device; and
an automatic braking control device that controls the brake control device to carry out automatic braking when the evasion determination device determines that the obstacle cannot be evaded.

9. The vehicle driving assist system according to claim 7, wherein:
the evasion determination device comprises a braking evasion determination device that determines whether the obstacle can be evaded only by braking the subject vehicle, and a steering evasion determination device that determines whether the obstacle can be evaded only by steering the subject vehicle, and
when one of the braking evasion determination device and the steering evasion determination device determines that the obstacle cannot be evaded, the automatic braking control device controls the brake control device to carry out the automatic braking.

10. The vehicle driving assist system according to claim 7, further comprising:
a reaction force correction device that corrects the reaction force calculated by the reaction force calculation device to a predetermined value when the evasion determination device determines that the obstacle cannot be evaded.

11. The vehicle driving assist system according to claim 4, wherein:
the operation device is the accelerator pedal.

12. The vehicle driving assist system according to claim 11, wherein:
the reaction force calculation device increases the reaction force of the accelerator pedal as the current risk potential becomes bigger.

13. The vehicle driving assist system according to claim 4, wherein:
the operation device is a brake pedal.

14. The vehicle driving assist system according to claim 13, wherein:
the reaction force calculation device reduces the reaction force of the brake pedal as the current risk potential becomes bigger.

15. A vehicle driving assist system comprising:
an obstacle detection means for detecting an obstacle in vehicle surroundings;
a risk potential calculation means for calculating a risk potential of a subject vehicle with respect to the obstacle based on detection results of the obstacle detection means;
a drive torque correction means for reducing drive torque generated at the subject vehicle, based on the risk potential calculated by the risk potential calculation means; and
a reaction force control means for controlling reaction force generated at an operation device through which a travel command for the subject vehicle is issued according to a correction amount for the drive torque to be reduced by the drive torque correction means.

16. A vehicle driving assist system comprising:
an obstacle detection means for detecting an obstacle in vehicle surroundings;
a risk potential calculation means for calculating a current risk potential of a subject vehicle with respect to the obstacle based on detection results of the obstacle detection means;

an accelerator pedal operation amount detection means for detecting an operation amount of an accelerator pedal;

a drive torque correction means for correcting a relationship of drive torque with respect to the accelerator pedal operation amount in a reduction direction based on the current risk potential calculated by the risk potential calculation means;

an engine control means for controlling an engine to generate the drive torque calculated by the drive torque correction means;

a reaction force calculation means for calculating a reaction force to be generated at an operation device through which a travel command for the subject vehicle is issued based upon the current risk potential calculated by the risk potential calculation means; and a reaction force generation means for generating the reaction force calculated by the reaction force calculation means.

17. A vehicle driving assist method comprising:
detecting an obstacle in vehicle surroundings;
calculating a risk potential of a subject vehicle with respect to the obstacle based on the detected obstacle;
reducing drive torque generated at the subject vehicle based on the calculated risk potential; and
controlling reaction force generated at an operation device through which a travel command for the subject vehicle is issued according to a correction amount for the drive torque to be reduced.

18. A vehicle driving assist method comprising:
detecting an obstacle in vehicle surroundings;
calculating a current risk potential of a subject vehicle with respect to the obstacle based on the detected obstacle;
detecting an operation amount of an accelerator pedal;
correcting a relationship of drive torque with respect to the accelerator pedal operation amount in a reduction direction based on the calculated current risk potential;
controlling an engine to generate the calculated drive torque;
calculating a reaction force to be generated at an operation device through which a travel command for the subject vehicle is issued based upon the calculated current risk potential; and
applying the calculated reaction force to the operation device.

19. A vehicle comprising:
a vehicle driving assist system that comprises (a) an obstacle detection device that detects an obstacle in vehicle surroundings; (b) a risk potential calculation device that calculates a risk potential of a subject vehicle with respect to the obstacle based on detection results of the obstacle detection device; (c) a drive torque correction device that reduces drive torque generated at the subject vehicle based on the risk potential calculated by the risk potential calculation device; and (d) a reaction force control device that controls reaction force generated at an operation device through which a travel command for the subject vehicle is issued according to a correction amount for the drive torque to be reduced by the drive torque correction device.

20. A vehicle comprising:
a vehicle driving assist system that comprises (a) an obstacle detection device that detects an obstacle in vehicle surroundings; (b) a risk potential calculation device that calculates a current risk potential of a subject vehicle with respect to the obstacle based on detection results of the obstacle detection device; (c) an accelerator pedal operation amount detection device that detects an operation amount of an accelerator pedal; (d) a drive torque correction device that corrects a relationship of drive torque with respect to the accelerator pedal operation amount in a reduction direction based on the current risk potential calculated by the risk potential calculation device; (e) an engine control device that controls an engine to generate the drive torque calculated by the drive torque correction device; (f) a reaction force calculation device that calculates a reaction force to be generated at an operation device through which a travel command for the subject vehicle is issued based upon the current risk potential calculated by the risk potential calculation device; and (g) a reaction force generation device that generates the reaction force calculated by the reaction force calculation device.

* * * * *